United States Patent Office 3,572,207
Patented Mar. 23, 1971

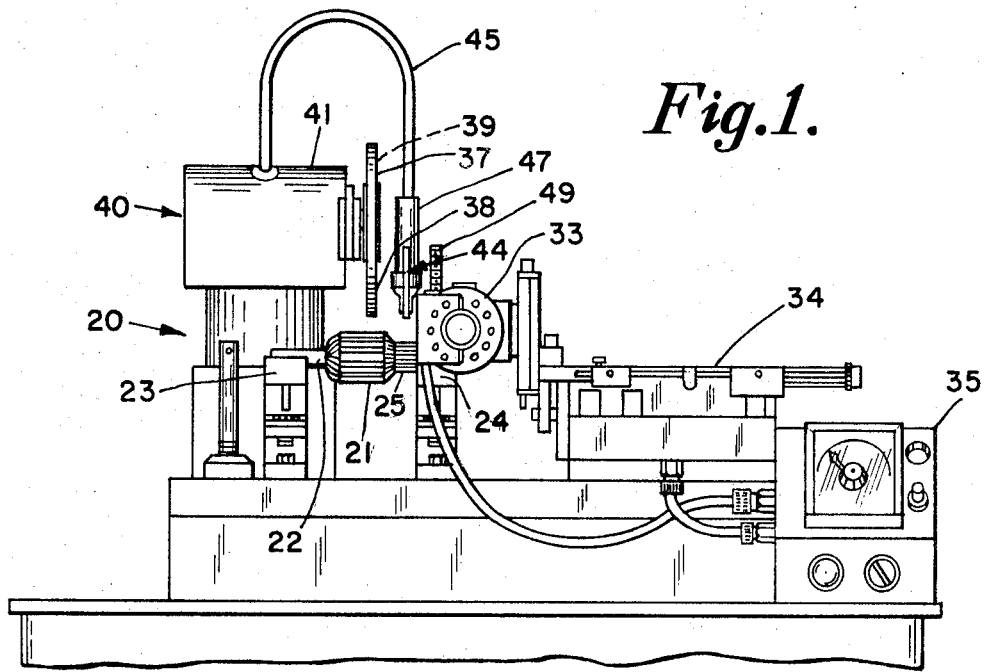
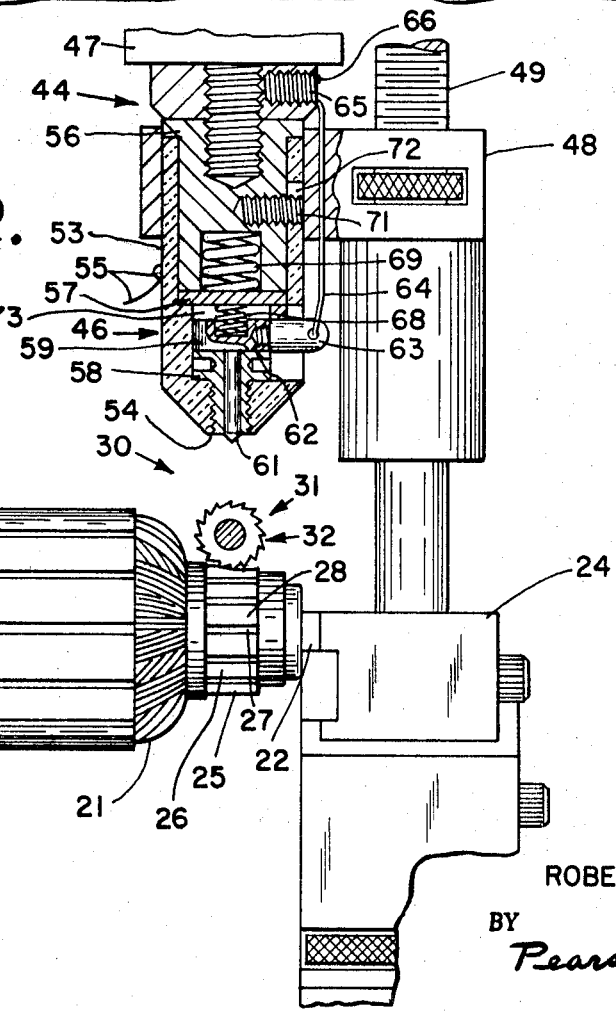

3,572,207
APPARATUS AND METHOD FOR AUTOMATICALLY INDEXING A WORKPIECE IN A MACHINE
Robert J. Fleming, West Yarmouth, Mass., assignor to Amdek Corporation, Sudbury, Mass.
Filed Feb. 14, 1969, Ser. No. 799,222
Int. Cl. B23c *3/30;* B23f *23/08;* B24b *19/00*
U.S. Cl. 90—15.1     7 Claims

ABSTRACT OF THE DISCLOSURE

Relative movement between the tool of a machine and an electrically conductive workpiece, having at least one non-conductive area, is accomplished by a stepping motor controlled by an R.F. generator probe normally in intimate contact with the surface of the workpiece but retractable therefrom in a path normal thereto. Stepping advance continues so long as the R.F. energy is absorbed by the workpiece, but halts instantaneously and precisely when the probe senses the non-conductive area, which may be a void, slot, or insulative insertion. The workpiece is rotatable in V bearings by a flexible drive belt to yield in conformance with the tool path.

BACKGROUND OF THE INVENTION

In powered machines for treating workpieces at a treatment station, for example, in machine tools, lathes, or the like, it has long been known to move the workpiece along a linear path, or to rotate the workpiece in a circular path, while successively performing identical treatment operations on the workpiece. For example, in cutting the teeth on a straight gear rack, or on a circular gear, there are automatic powered machines which, when once started at a particular location, will complete a cycle of repetitive machinings with an accuracy which is commercially acceptable, but such machines are costly, complicated, and cumbersome.

It has been proposed to use stepping motors for moving film strips, magnetic tape, paper and the like, along a path, such motors being commercially available and described in U.S. patents, such as 2,931,929 and 2,982,872 (Re. 25,445). However, stepping motors have not usually been used for accurate positioning in machining operations because of the difficulty of precisely controlling the stop positions of the motor and because of a tendency for the motor to hunt, or oscillate, when stopping.

Various control systems have been proposed for stepping motors, as exemplified by U.S. Pat. 3,225,277 to Foulger of Dec. 21, 1965, and U.S. Pat. 3,328,658 to Thompson of June 27, 1967, but these have been mainly directed to signalling reverse rotation of the motor or for dampening oscillation in the rotor.

It has also been known to provide an R.F. signal generator capable of serving as a limit switch, for example, the "Tuchswitch" made by R. B. Denison Manufacturing Co. of Bedford, Ohio.

SUMMARY OF THE INVENTION

In this invention, relative movement between a workpiece and a tool, in a machine, is achieved by a stepping motor and the stepping motor is controlled by an R.F. switch probe which contacts the workpiece. Either the workpiece is of electrically conductive material having at least one, and preferably a plurality, of spaced non-conductive zones, or a template is attached to the workpiece, the template having these characteristics. Stepping of the workpiece, or tool, is commenced while the probe is scanning the surface, or template, ready to sense the first non-conductive, or insulative zone, which may be a void, a slot filled with insulation, or other suitable benchmark. The circuit to the stepping motor includes the R.F. switch and the material of the workpiece, or template, so that immediately upon the switch sensing the benchmark, the stepping motor halts with the workpiece in the precise position for accurate treatment, such as the machining of a slot. Once the benchmark has been sensed, the machine tool itself can accurately locate future treatment positions, or preferably, future treatment positions can be precisely located by the probe sensing each successive, void, mica-filled slot, or other insulative zone on the workpiece surface. Repetition of the stepping motor indexing cycle, in an accurate manner for the full length of a linear workpiece, or fully around a circular workpiece, is thus achieved with no accumulation of error and with the positive assurance that such successive treatment will occur at exactly the desired location. The apparatus is especially for locating existing slots, rather than for cutting new slots so that the workpiece is preferably supported to rotate in V bearings by driving contact of a flexible belt, thereby permitting the slots to follow the path of the tool, such as an undercutter.

BRIEF DESCRIPTION OF THE DRAWING

FIG. 1 is a front elevation of a preferred embodiment of the invention in the form of an automatic lathe for undercutting the commutators of motor armatures;

FIG. 2 is an enlarged, fragmentary front elevation showing the R.F. probe in raised position during the slot undercutting operation, parts of the probe being broken away;

DESCRIPTION OF A PREFERED EMBODIMENT

Figure 3:
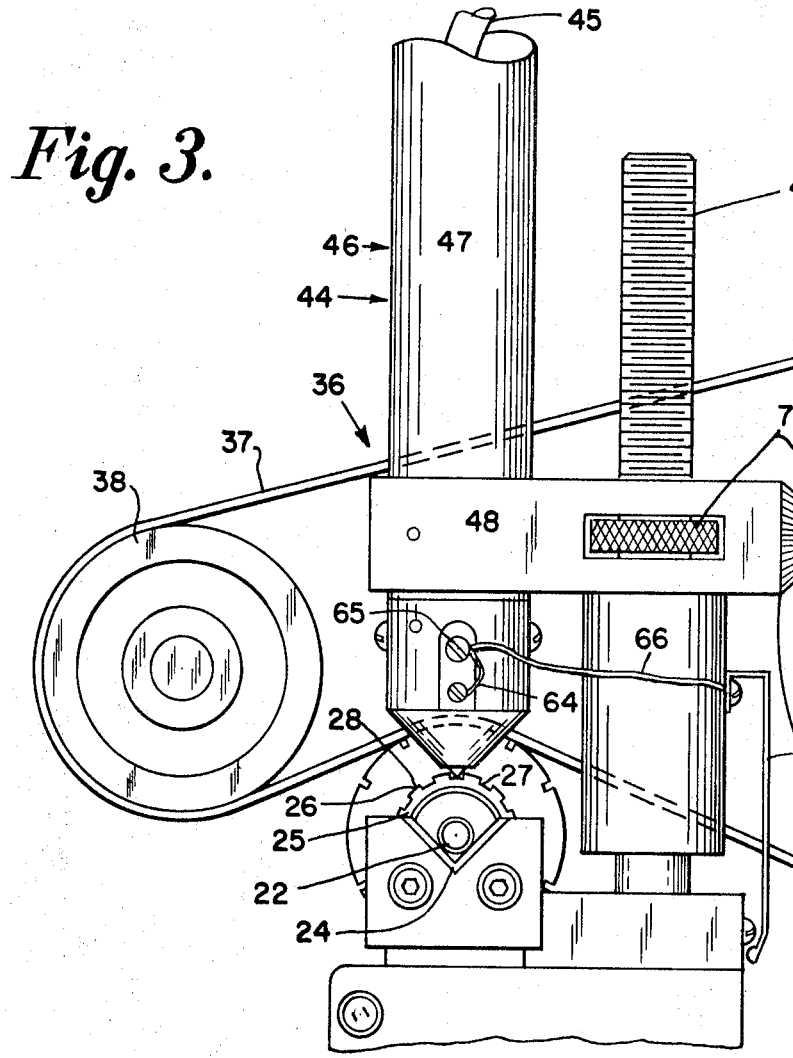
FIG. 3 is a side elevation, on the scale of FIG. 2, showing the probe in sensing position riding on the workpiece and showing the workpiece being moved by stepped motor indexing.

In the drawing, the apparatus of the invention is shown incorporated into a machine tool 20 of a type used to machine an electric motor armature 21.

Armature 21 includes the shaft 22, supported in V bearings 23 and 24, and including the commutator 25 having alternate metallic bars 26, usually of copper, and electrically conductive, and slots 27 which are non-electrically conductive so as to be insulative. Slots 27 may be voids, or may be filled with mica, and it will be understood that the machine of the invention is usable for accurately undercutting slots, for partially removing insulation in such slots, for making notches at the ends of slots, or for any other purpose in which it is desired to accurately repeat a treatment operation at definite, or indefinite, spaced distances along a workpiece, using each precisely located treatment operation as a benchmark or control location.

In the slotting machines now in use, the slots are cut equally, not allowing for different bar widths, askewness of segments, and bars not in plane with the axis of the commutator, thereby causing the cutting saw to cut into some copper segments.

The treatment station 30 is established by treatment means 31 in the form of a disc cutter tool member 32, rotated at high speed by the electric motor 33, the motor 33 being reciprocable with tool carriage 34 to advance along a slot 27, and then retract, under the control of tool cycle timer control means 35. As thus far described, the apparatus combines the workpiece 25 rotatably mounted in V bearings 23 and 24 and the cutter 32 reciprocably mounted on power operated carriage 34, so that an operator could manually attempt to turn the workpiece to the exact location of the desired cut, set the automatic cutter to undercut a slot, and then again attempt to turn the workpiece to the correct angular position for the next cut.

In this invention, advantage is taken of the fact that the surface 28, of the workpiece 25 is formed of alternate electric conductive zones, or bars, 26, and non-conductive voids 27, the latter occurring at predetermined but not always equal spaced distances along, or around, the surface 28.

The workpiece 25 is indexed in minute, discrete incremental steps by indexing means 36, which includes a flexible belt 37 trained around pulleys 38 and 39, the pulley 38 being carried on the vertically movable carriage 40. The stepping motor 41 turns the drive pulley 39. The lower stretch 42 of belt 37 has a free run positioned to yieldably and flexibly engage the surface of armature 21 when the carriage 40 is in lowered position to frictionally turn the armature and shaft 22 in V bearings 23 and 24. No collets, chucks, clamps or other rigid clamping mechanisms restrain the workpiece and it is yieldably supported for slight movement of its axis in the V bearings to enable an askew slot to conform to the cutter path. Stepping motor 41 is of a known type available from Superior Electric Company of Bristol, Conn., and turns the armature in 200–300 incremental steps per circumference, although it may be increased to 700–800 steps per circumference by readjusting the gearing, if desired.

The control means 44 of the invention comprises an electrical control circuit 45, which includes a source of current, cycle timer 35, the stepping motor 41, and switching mechanism 46, which preferably is an R.F. probe switch 47 of a commercially available type. Switch 47 is a solid state device which generates a low frequency R.F. signal, and is mounted on a vertically movable carriage 48, independent of carriage 40, to reciprocate in a linear path normal to the surface of the workpiece so that it may be raised out of the way during cutting, while the pulley 38 and belt 37 remain lowered to hold the armature in position. Both carriage 40 and 48 are actuated by suitable means, such as fluid piston and cylinder mechanism 49 and controlled in a known manner by the cycle timer 35 of the apparatus.

The single, sharp pointed R.F. signal generating probe 47 includes an exterior shell 53, of brass, steel, or other electrically conductive metal, terminating in a lower annular face 54 adapted to ride on the conductive surface 28 of the workpiece 25 to serve as one contact terminal of the switch. Shell 53 is grounded by ground connection 55 and contains adapter 56, stop disc 57, and adjusting bushing 58, all of insulative material, such as nylon. A probe contact pin 59, of hardened, high grade, tool steel, having a pointed terminal contact tip 61, adapted to ride the surface 28, is vertically slidable in bushing 58, the pin head 62 being connected by post 63 and wire 64 to post 65 and then connected by wire 66 to the limit switch 67. Pin 59 must be a good conductor to serve as the other contact terminal of switch 47.

It should be noted that there is a double flexation of the probe 47 by reason of the light spring 68 and the heavier spring 69 to permit the probe tip to follow an asymmetrical or irregular surface. The set screw 71 and slot 72 in shell 53 permit vertical movement, as does the chamber 73 in which the pin head 62 and spring 68 are located.

Switch 67 is positioned to sense the end of each successive cutting operation and signal the stepping motor to move the armature so that the probe tip again is in contact with the next successive metal bar 26, ready to sense the next successive void, or slot.

A micrometer adjusting screw mechanism 75 is provided on carriage 48 so that the probe 47 may be precisely located relative to the workpiece 25 and workpiece supporting means 23 and 24.

In operation, the shaft 22 of an armature 21 is placed in the V bearings 23 and 24 and the start button of cycle control 35 is pressed. The carriage 48 of probe assembly 46 then lowers until the probe tip 61 and annular face 54 engage a conductive bar 26 of surface 28 of commutator 25. At the same time the carriage 40 of indexing means 36 lowers the pulley 38 and belt 37 so that the belt engages the armature. Thus, automatically and simultaneously the probe switch 47 continues to signal the stepping motor to turn the commutator so long as tip 61 and face 54 contact the copper of bar 26, since the power to the motor is induced through the switch 47. Immediately upon the commutator being rotated by steps to a position wherein tip 61 no longer touches copper, but instead touches only a void, air gap, or mica filled slot, switch 47 stops motor 41.

The machine is so timed and controlled by cycle timer 35 that the instant tip 61 ceases to contact an electric conductor, armature 21 stops rotating and the commutator is in the precise true centre position for receiving treatment, such as a cut, by cutter 32.

In other words, the tip 61 senses an edge of a void, or insulative strip 27 and stops the workpiece with the centre of the tool face aligned with the centre of the desired cut. The tool 32, in the undercutter illustrated herein, removes any mica insulation, varnish, or small copper filings from the slot, and then retracts to its starting position. Timer control 35 causes the carriage 48 to rise, lifting the probe 47 out of the path of the cutter as the cutter advances into each slot. When the cutter has retracted after cutting, the carriage 48 automatically lowers until the tip 61 and face 54 again ride on the surface 28. As explained above, switch 67 has closed during this cycle to induce current to motor 41 through probe 47 to turn drive belt 37 momentarily, and thereby turn the commutator enough to cause the probe to begin its sensing cycle.

If the machine 20 is of a type having a mechanical indexing apparatus, so that only a first slot, or benchmark must be automatically and precisely located with the machine locating subsequent slots, the probe 47 has served its purpose. However, in other machines, such as the machine illustrated, repetition of the sensing and indexing cycle occurs automatically.

In FIG. 2 the probe is shown raised, the cutter is shown in a slot, and the armature is being held in place by the belt 37 (not shown). In FIG. 3 the belt 37 is still in lowered position, the cutter is retracted, and the probe is in sensing position on the commutator surface 28. The machine is so programmed that at the conclusion of a predetermined number of cuts the probe carriage 48 and the belt carriage 40 both are raised automatically to permit removal of the finished armature and substitution of a new workpiece.

Figure 4:
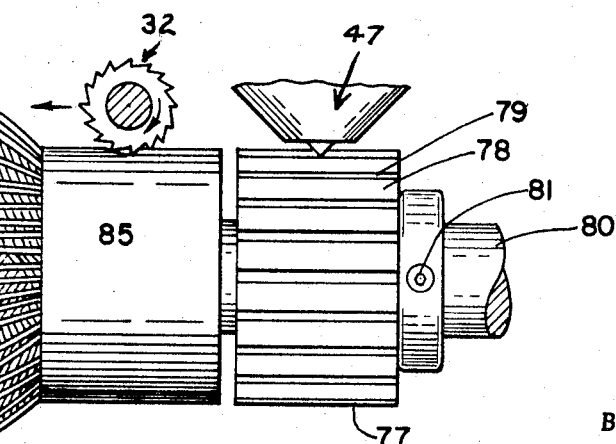
FIG. 4 is a fragmentary, side elevation of a commutator, having a template mounted on the shaft thereof.

As shown in FIG. 4, when it is desired to machine, or treat, a surface having no alternate conductive or non-conductive, areas, such as the unfinished, ungrooved commutator 85 of armature 76, a template 77 is used. Template 77 is identical with the desired finished, machined commutator, with metallic bars 78 and voids 79 and may be fixed alongside commutator 85, on shaft 80, by set screws 81 or other suitable means. The R.F. probe switch 47 rides on the template surface while the tool 32 operates on the commutator 85 to machine it identically with the template.

What is claimed is:

1. Apparatus for automatically and precisely performing repetitive undercuts on the commutator, of an armature having a surface with alternate electrically conductive bars and insulative slots therein, said apparatus comprising:

armature support means, and commutator undercutting means, one said means being mounted on said apparatus for movement relative to the other, said armature support means including V bearings rotatably supporting said armature and yieldable drive means for rotating said armature;

powered indexing means for moving said one means relative to the other to repeat a specific said undercut at definite intervals around the said commutator surface; and control means operatively connected to said indexing means, said control means including a radio frequency generator having a single, sharp pointed probe riding in intimate contact with said surface during said rotation, to sense each successive insulative slot thereon, halt said rotation with said undercutter means in the precise location on said surface for performing one of said repetitive undercutting treatments, and signal said indexing means to recommence rotation of said armature after completion of said undercut, and said V bearings and yieldable drive means permitting said commutator to rotatably yield under the influence of said undercutter means to permit the slots therein to follow the same even if certain slots are askew.

2. Apparatus as specified in claim 1, wherein said powered indexing means includes a stepping motor, for powering said yieldable drive means for rotating said armature means relative to the said undercutter means in a multiplicity of small increments, and the single, sharp pointed probe of said radio frequency generator is mounted to move toward and away from said commutator surface in a path normal thereto.

3. Apparatus as specified in claim 1, wherein said single, sharp pointed, probe of said R.F. generator includes an annular electrically conductive shell, encircling an annular insulative sleeve, the sleeve encircling a central, electrically conductive, sharp pointed, contact pin, said pin and shell passing current when both engage a metallic bar on said commutator, but ceasing to pass current when said tip engages an insulative bar.

4. In a machine tool for machining workpieces having spaced apart electrically conductive and insulative zones, on a surface thereof, the combination of:

workpiece support means, free of mechanism fixedly clamping said workpiece and including V bearing and flexible belt means for supporting and rotating said workpiece;

stepping motor means for automatically indexing each said workpiece relative to the tool of said machine, in small increments of rotation, and radio frequency generator means including a probe, means for mounting said probe to reciprocate in a path normal to said surface of said workpiece and to ride on said surface during said indexing, control means to halt said motor upon said probe sensing one of said insulative zones and reactuate said stepping motor means after each successive machining of said surface by said tool.

5. Apparatus as specified in claim 4, wherein said workpiece support means includes a template removably attached thereto, and said template constitutes said workpiece surface having alternate electrically conductive and insulative zones thereon, whereby the R.F. probe of said radio frequency generator means is responsive to said template in controlling said indexing means.

6. A machine for undercutting commutator insulation in the finished commutator of an armature having a surface consisting of alternate electrically conductive zones and electrically non-conductive zones, said machine comprising:

armature support means including V bearings rotatably supporting said armature to permit slight movement of the axis thereof, a stepping motor driving a flexible belt having a free run turning said commutator on its axis in a multiplicity of minute, discrete, incremental, angular steps of rotation, and an electric control circuit including a source of current, said motor and an R.F. probe switch, said switch having a sharp pointed central pin encircled by an annular conductive shell, means to move said probe switch in a path normal to said surface and ride thereon said probe switch being operative to open said circuit when said armature arrives at a non-conductive zone to instantaneously halt further rotation of said commutator, and said probe switch moving means being activated to move the probe switch in said path, away from said surface during undercutting of a slot therein.

7. A method for repeatedly undercutting the commutator of an armature, said commutator having alternate conductive bars and insulative slots on the surface thereof, said method comprising the steps of:

yieldably supporting said armature for rotation on its central longitudinal axis, rotating said armature in a multiplicity of minute, discrete, incremental steps along a path through undercutting station by applying a free run of a flexible drive belt thereto permitting said commutator to rotatably yield under the influence of an undercutter to allow said commutator slots to each conform to the path of said undercutter, sensing the arrival of each successive slot in said surface at said undercutting station, for precisely positioning a portion of said surface at said undercutting station, by continuously passing an R.F. signal through said commutator surface, as it is so indexed, until each successive slot bars the passage of said signal, and intantaneously halting the said indexing of said armature, in response to the said cessation of said R.F. signal, to permit each successive slot in said surface to be undercut at said undercutting station.

References Cited

UNITED STATES PATENTS

| | | | |
|---|---|---|---|
| 2,180,771 | 11/1939 | Poole | 90—15.1 |
| 2,718,177 | 9/1955 | Karmann | 90—15.1 |
| 3,160,070 | 12/1964 | Lobash et al. | 90—15.1X |
| 3,447,419 | 6/1969 | Foster | 318—18 |

GIL WEIDENFELD, Primary Examiner

U.S. Cl. X.R.

90—56; 74—816; 51—244; 318—18